(12) United States Patent
Persent et al.

(10) Patent No.: US 10,641,047 B2
(45) Date of Patent: May 5, 2020

(54) LINE ELEMENT WITH HOOPED TUBE AND HIGH-STRENGTH STEEL END FITTINGS, AND METHOD FOR UPGRADING A RISER PIPE WITH SAME

(71) Applicant: IFP Energies nouvelles, Rueil-Malmaison (FR)

(72) Inventors: Emmanuel Persent, Croissy sur Seine (FR); Daniel Averbuch, Vernaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 16/110,577

(22) Filed: Aug. 23, 2018

(65) Prior Publication Data

US 2019/0085642 A1     Mar. 21, 2019

(30) Foreign Application Priority Data

Aug. 24, 2017   (FR) ...................... 17 57856

(51) Int. Cl.
| | | |
|---|---|---|
| E21B 17/01 | (2006.01) | |
| E21B 19/16 | (2006.01) | |
| F16L 9/04 | (2006.01) | |
| F16L 13/02 | (2006.01) | |
| F16L 15/04 | (2006.01) | |
| F16L 21/00 | (2006.01) | |
| F16L 58/04 | (2006.01) | |

(52) U.S. Cl.
CPC .............. *E21B 17/01* (2013.01); *E21B 19/16* (2013.01); *F16L 9/047* (2013.01); *F16L 13/02* (2013.01); *F16L 15/04* (2013.01); *F16L 21/002* (2013.01); *F16L 58/04* (2013.01)

(58) Field of Classification Search
CPC .......... E21B 17/01; E21B 19/16; F16L 9/042; F16L 9/047; F16L 13/02; F16L 15/04; F16L 21/002; F16L 58/04
See application file for complete search history.

(56) References Cited

U.S. PATENT DOCUMENTS

| | | | | |
|---|---|---|---|---|
| 6,623,044 | B1 * | 9/2003 | Guesnon | ................. E21B 17/01 |
| | | | | 285/124.1 |
| 8,881,830 | B2 * | 11/2014 | Papon | ................... E21B 17/085 |
| | | | | 166/367 |
| 9,097,366 | B2 * | 8/2015 | Poirette | .................... F16L 13/02 |
| 10,072,466 | B2 * | 9/2018 | Persent | ................... E21B 17/01 |

(Continued)

FOREIGN PATENT DOCUMENTS

| | | |
|---|---|---|
| EP | 2985407 A1 | 2/2016 |
| FR | 2799789 A1 | 4/2001 |

(Continued)

*Primary Examiner* — Matthew R Buck
(74) *Attorney, Agent, or Firm* — Fitch, Even, Tabin & Flannery, LLP (57) ABSTRACT

The present invention relates to a line element comprising a hooped tube provided at both ends thereof with two receptacles in which male and female end fittings made of high-strength steel are fastened. The invention also relates to a riser section comprising at least one auxiliary line element having such characteristics. Furthermore, the invention relates to a method for upgrading a riser pipe by replacing an auxiliary line element with a line element having such characteristics.

20 Claims, 4 Drawing Sheets

(56) References Cited

U.S. PATENT DOCUMENTS

| | | | |
|---|---|---|---|
| 2003/0024587 A1* | 2/2003 | Guesnon | F16L 13/04 138/172 |
| 2003/0024628 A1* | 2/2003 | Guesnon | B29C 70/32 156/143 |
| 2008/0087351 A1* | 4/2008 | Paulshus | E21B 17/01 138/141 |
| 2011/0209878 A1* | 9/2011 | Guesnon | E21B 17/01 166/367 |
| 2013/0020087 A1* | 1/2013 | Guesnon | E21B 17/085 166/367 |
| 2016/0060971 A1* | 3/2016 | Persent | E21B 17/01 166/367 |

FOREIGN PATENT DOCUMENTS

| | | |
|---|---|---|
| FR | 2828121 A1 | 2/2003 |
| FR | 2828262 A1 | 2/2003 |
| FR | 2937676 A1 | 4/2010 |
| FR | 2956694 A1 | 8/2011 |
| WO | WO-2015169559 A1 * | 11/2015 |

\* cited by examiner

LINE ELEMENT WITH HOOPED TUBE AND HIGH-STRENGTH STEEL END FITTINGS, AND METHOD FOR UPGRADING A RISER PIPE WITH SAME

CROSS-REFERENCE TO RELATED APPLICATIONS

This application claims priority from French Patent Application No. 17/57.856, filed Aug. 24, 2017, which is hereby incorporated herein by reference in its entirety.

FIELD OF THE INVENTION

The present invention relates to the field of high-pressure pipes for equipping a drilling rig and/or a production facility. More precisely, it relates to an application of the hoop winding technique for reinforcing metal tubes with composite reinforcing elements. More specifically, the present invention relates to an auxiliary line of a riser pipe.

BACKGROUND OF THE INVENTION

The hoop winding technique consists in winding a reinforcing element, generally in form of a polymer-coated fibre tape, around a metal core so as to increase the internal pressure resistance of the core without significantly increasing the weight thereof, considering the low weight of the tapes.

The core can be a metal tube, made of steel for example. The reinforcing element is an elongate element. It can come in form of a strip, a wire, or preferably a wire assembly or a yarn coated with a polymer matrix.

According to an embodiment of the hoop winding technique, the reinforcing element is wound around the core while applying a tension. Thus, the reinforcing element wound around the core undergoes a tensile stress, which causes the metal core to undergo a compressive stress. The prestress undergone by the core is similar to the prestress that would be produced by an outside pressure.

Subsea reservoir drilling operations are carried out using a riser pipe allowing the blowout preventer located on the seabed to be connected to the sea surface. The riser is fitted with at least two auxiliary lines referred to as kill line (KL) and choke line (CL), whose main purpose is to provide a hydraulic connection between the sea surface and the sea bottom. More particularly, auxiliary lines make it possible to supply the well with fluid by circulating below a closed blowout preventer and/or to discharge a fluid from the well, without flowing through the riser pipe that does not withstand high pressures. The fluid thus carried, resulting from a kick from an underground reservoir, can circulate at a pressure that can be above 700 bars.

Figure 1:
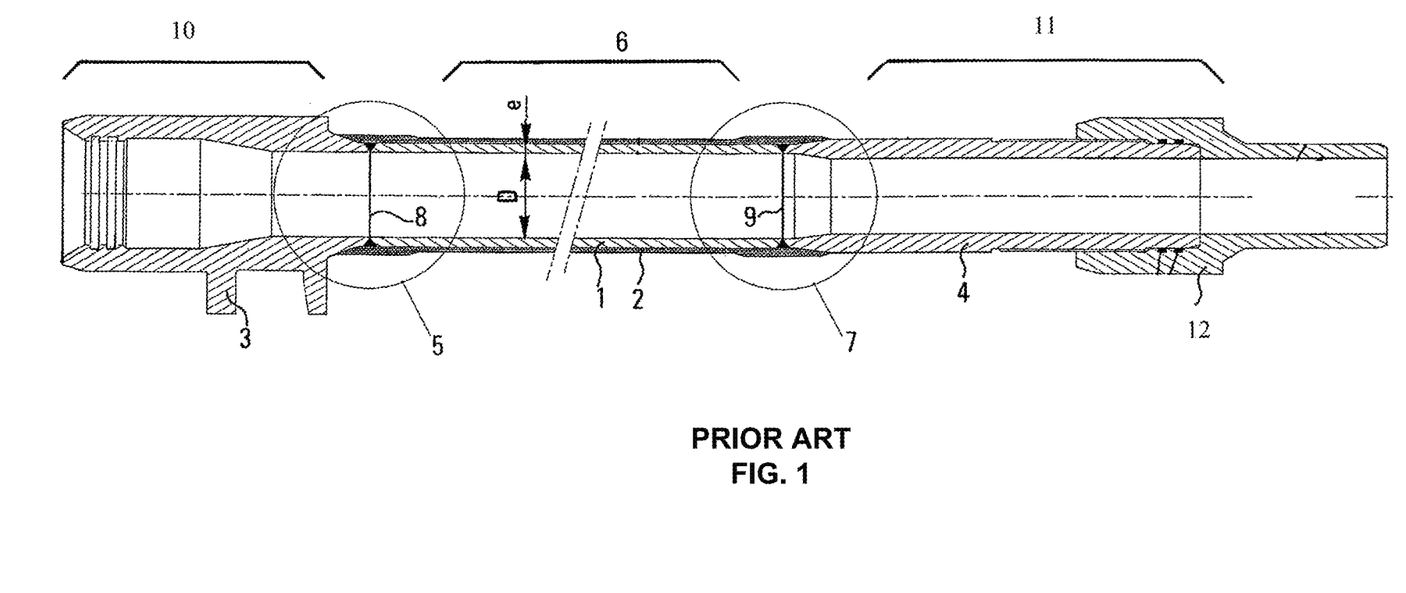
FIG. 1, already described, illustrates a line element according to the prior art.

It has been suggested to use hoop-wound tubes for the auxiliary lines of a drilling riser, notably in patents FR-2,828,262 and FR-2,828,121 filed by the applicant. Manufacturing a high-pressure line element from a hoop-wound tube is both simple and economical. FIG. 1 shows an example embodiment disclosed in the prior art. The line element comprises four distinct parts: a metal tube 1 or core, a first connecting means 3, a second connecting means 4 and hoop layers 2. Connecting means 3 is a female connecting means suited to be connected to a male pin 12 fastened to connecting means 4. Tube 1 is manufactured from a rolled blank for example, then connecting means 3 and 4 are directly welded onto ends 8 and 9 of tube 1. Hoop winding of the metal assembly is then achieved by winding a reinforcing element around tube 1 and around part of connecting means 3 and 4. Only the outer parts 10 and 11 of the connecting means are not hooped and they have sufficient thickness to withstand at least the same internal pressure as the hoop-wound part.

Thus, making such a pipe requires connecting means 3 and 4 whose ends to be welded have dimensions (diameters and thickness) that are suited to tube 1, so that they can be welded thereto directly. These connecting means 3 and 4 have to be mechanically compatible with the stress imposed by hoop winding on transition zones 5 and 7. However, the shapes and the dimensions of connecting means 3 and 4 are also imposed by their operational specifications and by the specific links intended for integration of the safety lines on the riser joint, in particular cooperation with the riser joints. All the constraints relative to the connecting means require a specific and complex implementation of these connecting means.

It is therefore not possible to standardize the design of high-pressure line elements according to the prior art (KL and CL) that require connections specific to the riser.

Another major constraint relative to pipes is their high pressure resistance. Typically, the steel pipes currently used for riser auxiliary lines are designed to withstand pressures of the order of 15,000 psi (i.e. 103 MPa). However, some new applications require auxiliary lines designed to withstand pressures of the order of 20,000 psi (i.e. 138 MPa). Current connecting means, notably those described in patent applications FR-2,828,262 and FR-2,828,121 filed by the applicant, do not allow to withstand such pressures.

Furthermore, adapting these configurations for higher pressures would require increasing the connecting means thickness. This would result in an increase in size and weight if the thickness is increased by increasing the outside diameter, and in a decrease in diameter and therefore a pressure drop increase if the thickness is increased by decreasing the inside diameter. The latter option would lead to a significant passage diameter reduction for the choke and kill lines, at the end fitting, of at least 1", i.e. 2.54 cm (3.5", i.e. 8.89 cm instead of 4.5", i.e. 11.43 cm). This reduction would cause pressure drops that might complicate blowout control operations. To a first approximation, it can be estimated that the pressure drops on turbulent flow are proportional to the length of line L, to the square of flow rate Q and inversely proportional to the diameter to the $5^{th}$ power.

$$\Delta P = k \frac{LQ^2}{D^5}$$

A local reduction of the inside diameter by 3.5" instead of 4.5" over a length of 3 ft, i.e. 91.4 cm, increases the pressure drops by about 10%. This increase reaches 26% for a 3", i.e. 7.62 cm, diameter and only 3% for a 4", i.e. 10.16 cm, diameter.

Furthermore, there is a need to adapt an existing riser so that it withstands higher pressures.

The present invention relates to a line element comprising a hooped tube provided at both ends thereof with two receptacles in which male and female end fittings made of high-strength steel are fastened. Using the hoop winding technique allows to limit the weight of the line while improving the pressure resistance of the line element. Equipping the connection with high-strength end fittings also provides pressure resistance of the line element, while limiting the thickness and therefore the weight of the connecting means.

The invention also relates to a riser section comprising at least one auxiliary line element having such characteristics. Furthermore, the invention relates to a method for upgrading a riser pipe by replacing an auxiliary line element with a line element having such characteristics.

SUMMARY OF THE INVENTION

The invention relates to a line element comprising at least one hooped tube, said hooped tube having a central part consisting of a tubular steel core covered with at least one hoop layer, two receptacles fastened to the ends of said tubular core, a male end fitting and a female end fitting fastened in said receptacles. Said male and female end fittings are made of high-strength steel.

According to an embodiment of the invention, said receptacles are welded onto the ends of said tubular core.

According to an implementation, at least one receptacle is partly covered with at least one hoop layer.

Advantageously, at least one additional hoop layer extends on either side of the weld between said tubular core and said receptacle.

According to an aspect, said receptacles are made of steel whose elastic limit is similar to that of said steel of said tubular core, and lower than the elastic limit of said male and female end fittings.

According to a feature, said male and female end fittings are fastened in said receptacle by screwing, hoop winding or gluing.

According to an aspect of the invention, the inside diameter of said male and female end fittings is substantially equal to the inside diameter of said tubular core.

Preferably, said hoop layers consist of reinforcing elements made of composite material, notably from fibres coated with a polymer matrix.

Advantageously, said receptacles comprise a portion having a substantially truncated cone shape.

Moreover, the present invention relates to a riser section comprising a main tube element and at least one auxiliary line element arranged substantially parallel to said main tube element, the ends of said main tube comprising connecting means, and wherein said auxiliary line element is a line element having one of the above characteristics.

Furthermore, the invention relates to a method for upgrading a riser comprising at least two riser sections, each riser section comprising a main tube element and at least one auxiliary line element arranged substantially parallel to said main tube element, said auxiliary line element having connecting means at both ends. In this method, at least the following steps are carried out for at least one riser section:

a) dismounting at least one auxiliary line element,
b) fastening a receptacle to each end of a tubular steel core,
c) covering said tubular core with at least one hoop layer,
d) positioning with respect to said main tube element said hooped tubular core provided with said receptacles substantially parallel to said main tube element in place of said dismounted auxiliary line element, and
e) fastening a male end fitting and a female end fitting in said receptacles, said male and female end fittings being made of high-strength steel.

According to an embodiment, said male and female end fittings are fastened to said receptacles by screwing, hoop winding or gluing.

According to an implementation, at least one receptacle is partly covered with at least one hoop layer.

Advantageously, said tubular core is made from said dismounted auxiliary line element from which the connecting means have been removed.

According to an aspect of the invention, said hoop layers are covered with a protective layer.

Preferably, said method comprises an initial step of disassembling at least one equipment of said riser, such as a float, a clamp or a guide plate.

According to an implementation of the invention, said method comprises a final step of assembling at least one equipment of said riser section, such as a float, a clamp or a guide plate.

Advantageously, said tubular core is positioned by means of flanges provided on said main tube element.

BRIEF DESCRIPTION OF THE FIGURES

Other features and advantages of the device according to the invention will be clear from reading the description hereafter of embodiments given by way of non-limitative example, with reference to the accompanying figures wherein.

DETAILED DESCRIPTION OF THE INVENTION

Line Element

The present invention relates to a high-pressure line element. The line element comprises a hooped tube. The hooped tube comprises a central part consisting of a tubular steel core and two receptacles fastened to both ends of the tubular core, the tubular core being covered with at least one hoop layer. Furthermore, the high-pressure line element comprises a male end fitting fastened in a first receptacle and a female end fitting fastened in a second receptacle. The male end fitting is intended to cooperate with a female end fitting of a second line element so as to create a tight connection between the two line elements.

According to the invention, the male and female end fittings are made of high-strength steel. High-strength steel has very good mechanical properties such as tensile strength and stress resistance. Its characteristics allow significant thickness reductions and therefore a weight reduction during use. Thus, the line element can withstand high pressures while having a limited weight, and without overthickness likely to generate pressure drops. Preferably, the steel used for the end fittings has an elastic limit greater than or equal to 110 ksi, i.e. 758 MPa.

According to an example embodiment, the male and female end fittings can be made of a steel selected from among the following grades: 4130, 4140 (ASTM), C90, T95, C110, P110, Q125 (API), etc.

The combined use of a hooped tube and of high-strength steel end fittings enables a significant mass gain and high pressure resistance.

Providing a line element fitted with receptacles and male and female end fittings allows to design and to manufacture the tubular core and the male and female end fittings in an independent manner, but specific to each facility.

Advantageously, in order to allow symmetry and modularity of the line element, the two receptacles can be identical.

According to an aspect of the invention, the receptacles can have a truncated cone shape. According to a non-limitative example embodiment, the receptacles can consist of a cylindrical first part, a second part having the shape of a truncated cone and a cylindrical third part, so as to have a receptacle of continuous section, i.e. without the discontinuities that may be formed by shoulders for example. The cylindrical first part is the part intended to be fastened to the tubular core and the third part is intended to receive the male and female end fittings. Preferably, the outside diameter, the inside diameter and the thickness of the cylindrical first part are substantially identical to the outside diameter, inside diameter and thickness of the tubular core. Thus, fastening the receptacle onto the tubular core is facilitated. Similarly, the inside diameter of the cylindrical third part corresponds to the outside diameter of the male and female end fittings. Advantageously, the receptacle can have a substantially constant thickness over the entire length thereof.

The conicity of said truncated cone-shaped part can range between 10° and 45°. Indeed, the conicity of said truncated cone-shaped part can be greater than 10° so as to limit the length of the truncated cone-shaped part, in order to reduce the mass of the transition element and therefore the mass of the line element. Furthermore, the conicity can remain less than 45° to facilitate and improve winding of the composite reinforcing element (hoop winding).

To decrease the weight of the transition element, it is interesting to limit the length of the cylindrical third part. This length is useful to enable fastening of the male and female end fittings.

According to an embodiment of the invention, the receptacles are welded to the ends of the tubular core. Fastening is thus easy to implement since it requires no particular design for the tubular core or the receptacles.

In order to reinforce the receptacles, at least one hoop layer can cover at least partly the receptacles.

This is particularly advantageous when the receptacles are welded onto the tubular core because it reinforces the weld. According to an example embodiment, at least one additional hoop layer (in addition to those provided for the tubular core) can be provided and extend on either side of the weld between the tubular core and the receptacle. The number of additional hoop layers can be so selected that the internal pressure resistance of the weld zone is higher than the internal pressure resistance of the central zone of said tubular core. Thus, the line element affords the advantage of being more internal pressure resistant at the weld zone than at the tubular core.

For the embodiment described above, where the receptacle comprises a truncated cone-shaped part between two cylindrical parts, the hoop layer can cover the cylindrical first part of the receptacle, which is the part of the receptacle of minimal diameter.

Advantageously, the receptacles are made of steel whose elastic limit is substantially equal to the elastic limit of the steel used for the tubular core, whose elastic limit is lower than the elastic limit of the steel used for the male and female end fittings.

According to an example, the receptacles can be made of 4130 steel (ASTM standard) having an elastic limit of 80 ksi, i.e. 552 MPa.

According to an example, the tubular core can be made of X80 steel (API 5L standard) having an elastic limit of 80 ksi, i.e. 552 MPa. Alternatively, the tubular core can be made of X65, X70, X75, X90, X100 steel (API 5L standard).

According to an aspect of the invention, the male and female end fittings can be fastened in the receptacles by screwing. This simple fastening is compatible with the materials of the receptacles and of the male and female end fittings.

Alternatively, the male and female end fittings can be fastened in the receptacles by hoop winding, gluing or any similar means.

In order to limit pressure drops, the inside diameter of the male and female end fittings can be substantially equal to the inside diameter of the tubular core. For these values, substantially equal is understood to mean a difference of approximately 10%.

For the embodiment where the receptacles comprise a truncated cone-shaped part between two cylindrical parts, the inside diameter of the first cylindrical part of the receptacle can be substantially equal to the inside diameter of the tubular core and to the inside diameter of the male and female end fittings.

The reinforcing element (forming the hoop layers) can be made from a polyamide matrix reinforced with fibres, notably carbon fibres. Alternatively, other matrices can be used, such as epoxides, polypropylenes, polyethylenes, polyetheretherketones, polyvinylidene fluorides, or other fibres such as glass or aramids. The hoop comprises a sufficient number of layers for the tube to withstand a predetermined internal pressure. The number of hoop layers is generally constant over the entire length of the tubular core. It is reminded that one of the principles of the hoop winding technique consists in inducing a compressive prestress in the tubular core (and possibly in a portion of the receptacle covered with reinforcing layers). Thus prestressed, the internal pressure resistance capacity of the tubular core is increased since the allowable pressure in this line element is increased by the value of the internal pressure that would balance the hoop pressure. Another advantage of hoop winding is the decrease in mass of the line element. Indeed, making a line element only from metal with the same internal pressure resistance requires a greater tube thickness, which involves a greater tube mass.

According to an embodiment, hoop winding is performed by winding under tension one or more reinforcing layers around the tubular core and optionally part of the receptacles. The reinforcing element under tension induces a compressive stress in the tubular core and optionally in the covered part of the receptacles.

The outer surface of the hooped tube of the line element according to the invention can be covered with a protective sheath allowing to protect it notably from the marine environment. This protective sheath can be applied by reeling, i.e. by winding an elongate element around the hooped tube in contiguous turns bonded together. The elongate element can be reeled without tension and it can be made from a glass fiber or Kevlar®-reinforced polyamide matrix. The protective sheath can also be used to give the outside tint of the hooped tube, white for example.

In a variant, the prestress applied in the core by hoop winding can be achieved by other means than tensioning the reinforcing tape, thus hoop winding can notably be achieved:
  by internal pressurization of the line element causing plastic deformation of the tubular core, this technique is referred to as self-hooping: the reinforcing element is wound without tensional stress or with a very low stress on the metal tube; the hoop stress is introduced during hydraulic testing of the tube thus formed at a pressure causing the elastic limit to be exceeded in the metal tube and plastic deformation of the tube. After return to a zero pressure, residual compressive stresses remain in the metal tube, as well as tensile stresses in the composite reinforcing elements, or by deformation of the tubular core through tensile strain on the tubular core and by applying a pressure on the outside of the tubular core (this embodiment is described in patent application FR-2,961,427 filed by the applicant).

The receptacles and the male and female end fittings are tubular parts that can be obtained for example by machining, forging or casting, independently of the tubular core.

Furthermore, the tubular core can be made from a steel rolled blank.

Figure 2:
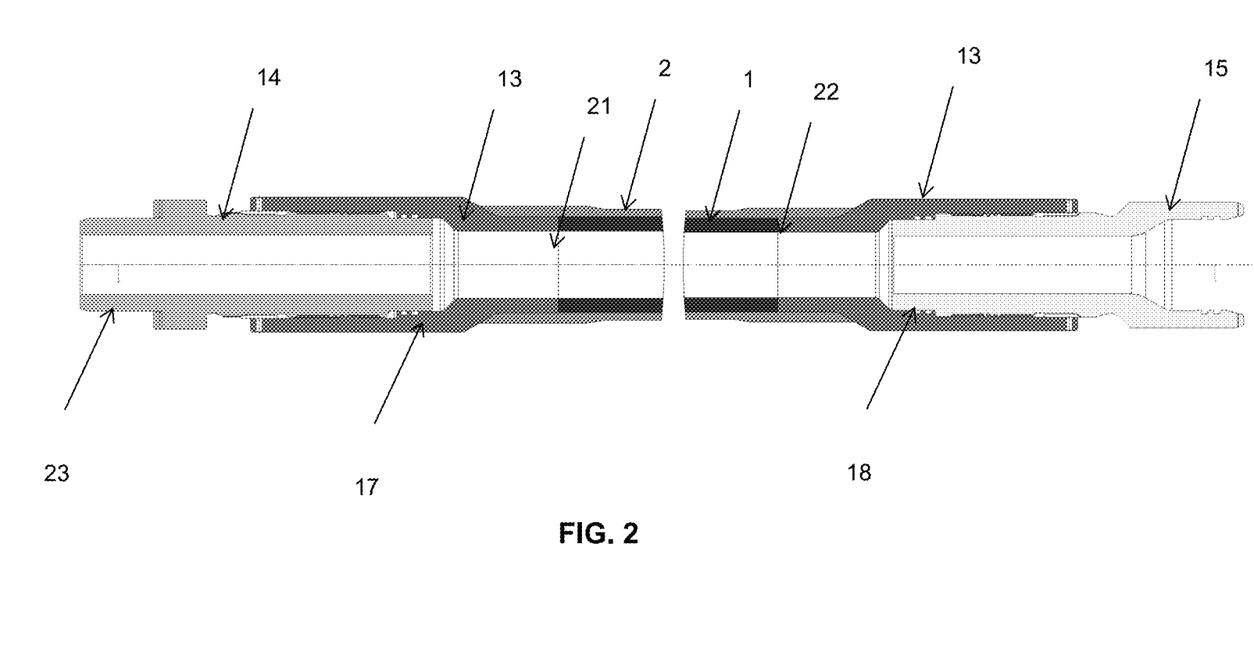
FIG. 2 illustrates a line element according to an embodiment of the invention.
Figure 3:
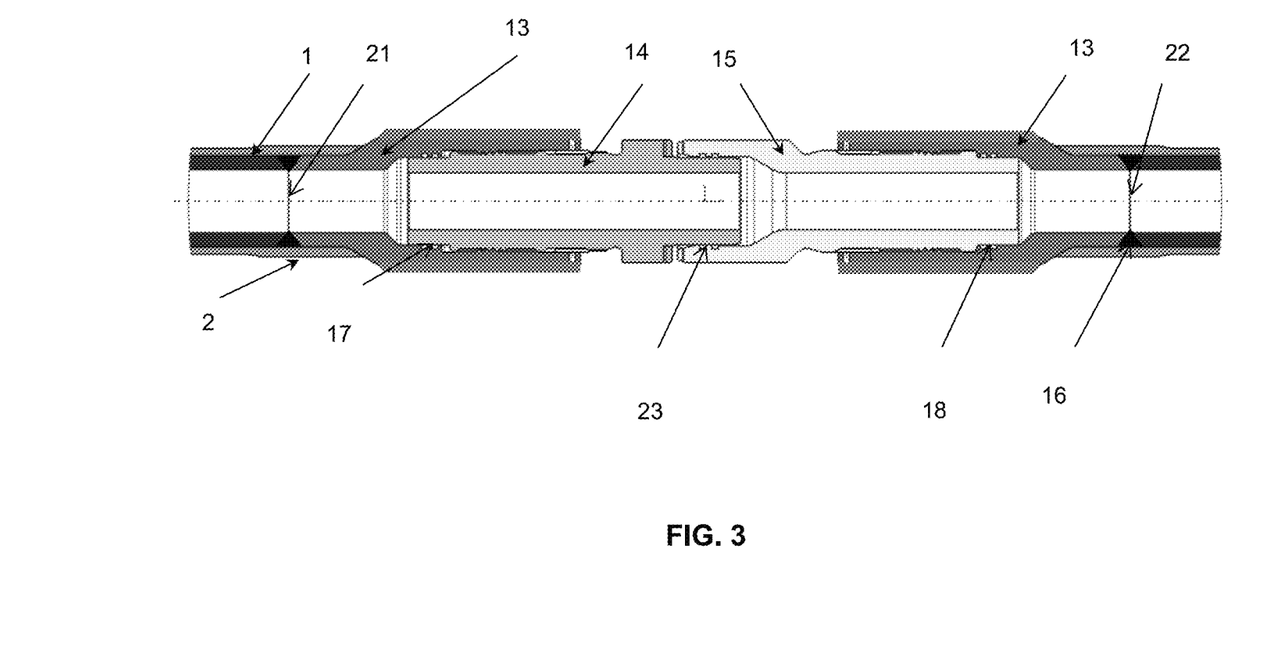
FIG. 3 illustrates the connection of two line elements according to an embodiment of the invention.

FIGS. 2 and 3 schematically illustrate, by way of non-limitative example, an embodiment of a high-pressure line element according to the invention. FIG. 2 illustrates a line element and FIG. 3 illustrates the connection of two line elements.

The hooped tube according to the invention is made up of a tubular core 1 and of two identical receptacles 13 fastened through welds 16 to ends 21 and 22 of said tubular core 1. Tubular core 1 consists of a metal tube having a substantially constant outside diameter and thickness over the length thereof and of a reinforcing layer 2. Receptacles 13 are welded 16 onto tubular core 1. Receptacles 13 comprise a truncated cone-shaped portion between two cylindrical portions. The first cylindrical portion, welded to tubular core 1, has an inside diameter, an outside diameter and a thickness substantially identical to the inside diameter, outside diameter and thickness of the tubular core. The truncated cone-shaped part allows receptacle 13 to be widened, so that the inside diameter of receptacle 13 for the other cylindrical portion corresponds to the outside diameter of the male 14 and female 15 end fittings. Furthermore, the male 14 and female 15 end fittings are fastened in (within) receptacles 13. The male 14 and female 15 end fittings are used for connecting two line elements. Male end fitting 14 is fastened in receptacle 13 by screwing by means of a bore 17. Female end fitting 15 is fastened in receptacle 13 by screwing by means of a bore 18. The inside diameter of the male 14 and female 15 end fittings is substantially identical to the inside diameter of tubular core 1 and of the first cylindrical part of receptacle 13. Male end fitting 14 comprises at its end a portion 23 that fits into female end fitting 15 so as to form a tight connection between two line elements.

To provide good resistance to the internal pressure related to the pressures of the fluid circulating in the line, tubular core 1 is covered over at least the entire length thereof with a number of hoop layers 2 consisting of a reinforcing element. In the preferred embodiment illustrated, hoop 2 is applied equally on either side of weld zone 16, therefore also partly on receptacles 13. For this zone, additional hoop layers are generally applied.

Riser Section

The invention also relates to a riser section comprising a main tube element, an auxiliary line element arranged substantially parallel to the main tube element, the ends of the main tube element comprising connecting means for connecting two main tube elements to one another.

According to the invention, the auxiliary line element is a line element according to any of the variant combinations described above.

Preferably, the means for connecting the main tube elements are designed and dimensioned to meet the specifications mentioned by the API 16 R and API 2 RD standards edited by the American Petroleum Institute.

According to an embodiment, the connecting means comprise a locking ring. The locking ring can be internal (inside the main tube), external (outside the main tube and between the main tube and the auxiliary lines) or peripheral (outside the main tube and outside the auxiliary lines).

Advantageously, the locking ring can be suited to form a bayonet assembly with at least one main tube element. Alternatively, the locking ring can be suited to form a screwed assembly with at least one main tube element.

An example of an external ring with a bayonet assembly is described in patent applications FR-2,799,789, FR-3,020, 654 and FR-3,045,708.

Alternatively, the connecting means can comprise bolted flanges or any other similar connecting means.

According to a non-limitative example, the auxiliary line made up of line elements according to the invention is a kill line or a choke line. A choke line is a safety line carrying fluids (oil, water, gas) coming from the well upon an inflow and driving them towards the choke manifold and the flare. A kill line is a safety line enabling injection into the well of heavy fluids and cements allowing an otherwise uncontrollable blowout to be stopped.

Method for Upgrading a Riser Pipe

Furthermore, the purpose of the present invention is to make an existing riser pipe withstand higher pressures (for example to make a riser initially resistant to 15,000 psi, i.e. 103 MPa, withstand a pressure of 20,000 psi, i.e. 138 MPa). The present invention therefore relates to a method for upgrading a riser comprising at least two riser sections. Each riser section comprises a main tube element and at least one auxiliary line element not in accordance with the invention. The method according to the invention provides replacement of an auxiliary line element not in accordance with the invention by an auxiliary line element in accordance with the invention (and therefore more resistant to high pressures) by means of the following steps:

dismounting at least one auxiliary line element of the riser section, fastening a receptacle to each end of a tubular steel core, preferably by welding, covering the tubular core with at least one hoop layer, positioning, with respect to the main tube element, the hooped tubular core provided with receptacles substantially parallel to the main tube element in place of the dismounted auxiliary line element, and fastening a male end fitting and a female end fitting in the receptacles, the male and female end fittings being made of high-strength steel.

The method affords the advantage of not modifying the main tube of the riser pipe, which makes the riser upgrading method simple and inexpensive. Furthermore, the method according to the invention allows not to modify the end flanges of the main tube and the floats the riser pipe is equipped with.

After the stages of the method according to the invention, an auxiliary line element suited to a drilling riser according to one of the variant combinations described above is obtained, for example a line element as described in connection with FIGS. 2 and 3. This auxiliary line element withstands high pressures while having a limited weight.

The riser can be designed and dimensioned to meet the specifications mentioned by the API 16 R and API 2 RD standards edited by the American Petroleum Institute.

Advantageously, the stages of the method according to the invention are carried out at the surface and not at sea.

According to an embodiment, the male and female end fittings can be fastened to the receptacles by screwing. This fastening is compatible with the materials of the receptacles and of the male and female end fittings.

Alternatively, the male and female end fittings can be fastened in the receptacles by hoop winding or gluing.

In order to ensure modularity of the auxiliary line element, the two receptacles can be identical.

According to an implementation of the invention, the receptacles are made of steel whose elastic limit is similar to the elastic limit of the tubular core and whose elastic limit is lower than the elastic limit of the steel of the male and female end fittings.

In order to reinforce the fastening between the receptacle and the tubular core, at least one receptacle can also be covered at least partly with at least one hoop layer. This is particularly advantageous for the embodiment wherein the receptacle is welded on the tubular core.

Furthermore, in order to optimize the reinforcement at the fastening, additional hoop layers can be provided so as to extend on either side of the fastening between the tubular core and the receptacles.

The reinforcing element (making up the hoop layers) can be made from a polyamide matrix reinforced by fibres, notably carbon fibres. Alternatively, other matrices can be used, such as epoxides, polypropylenes, polyethylenes, polyetheretherketones, polyvinylidene fluorides, or other fibres such as glass or aramids. The hoop comprises a sufficient number of layers for the tube to withstand a predetermined internal pressure. The number of hoop layers is generally constant over the entire length of the tubular core. It is reminded that one of the principles of the hoop winding technique consists in inducing a compressive pre-stress in the tubular core (and possibly in a portion of the receptacle covered with reinforcing layers). Thus pre-stressed, the internal pressure resistance capacity of the tubular core is increased since the allowable pressure in this line element is increased by the value of the internal pressure that would balance the hoop pressure. Another advantage of hoop winding is the decrease in mass of the line element. Indeed, making a line element only from metal with the same internal pressure resistance requires a greater tube thickness, which involves a greater tube mass.

According to an embodiment, hoop winding is performed by winding under tension one or more reinforcing layers around the tubular core and optionally part of the receptacles. The reinforcing element under tension induces a compressive stress in the tubular core and optionally in the covered part of the receptacles.

The outer surface of the hooped tube of the line element according to the invention can be covered with a protective sheath allowing to protect it notably from the marine environment. This protective sheath can be applied by reeling, i.e. by winding an elongate element around the hooped tube in contiguous turns bonded together. The elongate element can be reeled without tension and it can be made from a glass fiber or Kevlar®-reinforced polyamide matrix. The protective sheath can also be used to give the outside tint of the hooped tube, white for example.

In a variant, the prestress applied in the core by hoop winding can be achieved by other means than tensioning the reinforcing tape, thus hoop winding can notably be achieved:

by internal pressurization of the line element causing plastic deformation of the tubular core, this technique is referred to as self-hooping: the reinforcing element is wound without tensional stress or with a very low stress on the metal tube; the hoop stress is introduced during hydraulic testing of the tube thus formed at a pressure causing the elastic limit to be exceeded in the metal tube and plastic deformation of the tube. After return to a zero pressure, residual compressive stresses remain in the metal tube, as well as tensile stresses in the composite reinforcing elements, or by deformation of the tubular core through tensile strain on the tubular core and by applying a pressure on the outside of the tubular core (this embodiment is described in patent application FR-2,961,427 filed by the applicant).

The stages of positioning and fastening the end fittings can be carried out using flanges provided on the main tube element. Advantageously, the flanges can be provided at the ends of the main tube element. The flanges can comprises orifices for passage of the substitute auxiliary line element.

According to a first embodiment, the tubular core used can be a tubular core specifically made for the method.

Alternatively, the tubular core can be obtained from the dismounted auxiliary line element. Therefore, once dismounted, the connecting means are removed at the core ends, and the initial tubular core can be cleaned and sand-blasted for better adhesion of the hoop layers.

A riser is generally provided with equipments such as floats, other auxiliary lines, clamps, guide plates. These equipments are generally independent of the auxiliary lines.

In this case, the method according to the invention can comprise an initial stage (i.e. prior to the cutting stage) of disassembling these equipments. Thus, it is easier to handle the riser sections and to carry out the stages of dismounting the initial auxiliary line element and of assembling the auxiliary line element according to the invention. Preferably, disassembling is performed in this order: the floats, the clamps, other auxiliary lines and optionally guide plates.

Besides, the method according to the invention can comprise a final stage of assembling these equipments. Assembling is preferably performed in this order: the optional guide plates, the other auxiliary lines, the clamps and the floats.

Preferably, the riser equipments are not modified by the method according to the invention. Thus, modification of the riser only concerns part of the auxiliary lines.

Figure 4:
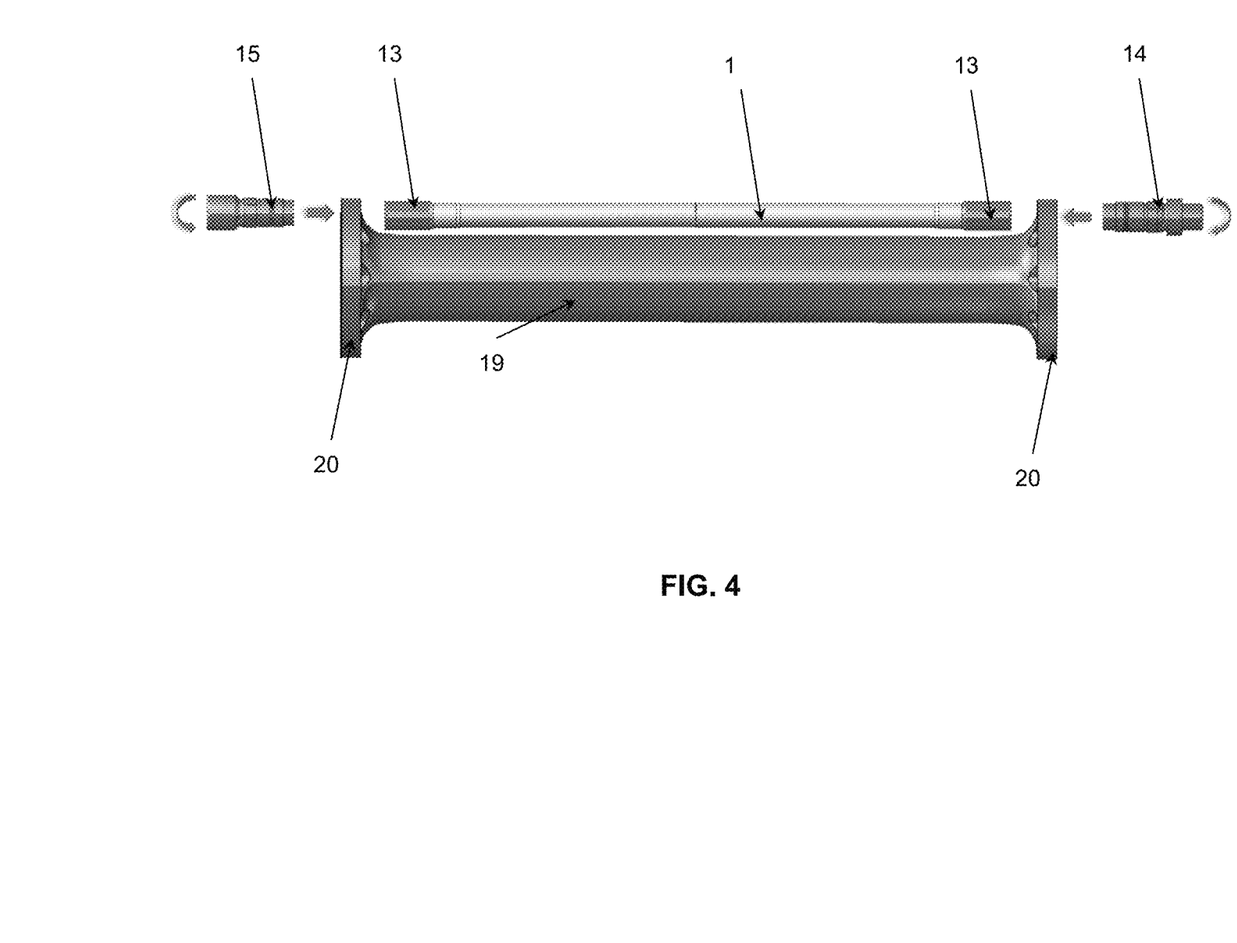
FIG. 4 illustrates a stage of the method for upgrading a riser section according to an embodiment of the invention.

FIG. 4 schematically illustrates, by way of non limitative example, a stage of the method for upgrading a riser according to the invention. This figure illustrates the stage of fastening the male 14 and female 15 end fittings in receptacles 13. The auxiliary line element comprising hooped tubular core 1 and receptacles 13 is therefore positioned substantially parallel to main tube element 19. Main tube element 19 comprises at its ends flanges 20 for passage of the auxiliary lines. For fastening the male 14 and female 15 end fittings, they are first translated longitudinally so as to be inserted in receptacles 13 by passing through the orifices of flanges 20. The male 14 and female 15 end fittings are then rotated in receptacles 13 so as to be fastened by screwing.

Comparative Example

The features and advantages of the invention will be clear from reading the comparative example hereafter.

The table below compares the current riser architecture (according to the prior art) with its steel (no hoop reinforcement) Choke and Kill (C & K) lines specified for 15,000 psi (103 MPa) with the same column where the Choke and Kill lines are replaced by hybrid lines (steel with hoop reinforcement) specified for 20,000 psi (138 MPa) according to the invention. It can be noted, among other things, that the linear weight of the hybrid tube according to the invention is less than that of the steel tube according to the prior art, although its resistance is higher. This lightening translates into a 598,000 Lbs (271 tons) gain on the total weight of the riser. The outside diameter of the hybrid tube according to the invention slightly exceeds that of the steel tube according to the prior art (6.5", i.e. 16.51 cm, vs. 6.7", i.e. 17 cm), but it remains smaller than the diameter of the float recesses. In other words, these lines can be housed in the original floats without any modification.

TABLE 1

Comparison of riser pipes

|  | Riser according to the prior art | Riser according to the invention |
|---|---|---|
| Riser make-up | | |
| Sections at the top | 4 | 4 |
| Sections with floats | 80 | 80 |
| Section at the bottom | 5 | 5 |
| Main tube | | |
| Thickness WT | 2.38 cm | 2.38 cm |
| Outside diameter OD | 53.34 cm | 53.34 cm |
| Floats | | |
| Diameter | 147 cm | 147 cm |
| C & K lines | | |
| Pressure resistance | 103 MPa | 138 MPa |
| Steel thickness | 2.54 cm | 1.75 cm |
| Composite thickness | | 1.04 cm |
| Steel prestress | | 248 MPa |
| Tube outside diameter | 16.51 cm | 17 cm |
| Linear weight | 86.3 kg/m | 62.5 kg/m |
| Riser mass in air | 2939 t | 2668 t |
| Steel | 1866 t | 1560 t |
| Composite | | 34 t |
| Floats | 1073 t | 1073 t |
| Riser mass in water | 315 t | 59 t |

The invention claimed is:

1. A line element comprising at least one hooped tube, the hooped tube having a central part consisting of a tubular steel core covered with at least one hoop layer, two receptacles fastened to ends of the tubular core, a male end fitting and a female end fitting fastened in the receptacles, wherein the male and female end fittings are made of high-strength steel, wherein the receptacles are made of steel having an elastic limit lower than an elastic limit of the male and female end fittings.

2. A line element as claimed in claim 1, wherein the receptacles are welded onto the ends of the tubular core.

3. A line element as claimed in claim 1, wherein at least one receptacle is partly covered with the at least one hoop layer.

4. A line element as claimed in claim 2, wherein at least one additional hoop layer extends on either side of a weld between the tubular core and at least one of the receptacles.

5. A line element as claimed in claim 1, wherein the elastic limit of the steel of the receptacles is similar to that of the steel of the tubular core.

6. A line element as claimed in claim 1, wherein the male and female end fittings are fastened in the receptacles by screwing, hoop winding or gluing.

7. A line element as claimed in claim 1, wherein the inside diameter of the male and female end fittings is substantially equal to the inside diameter of the tubular core.

8. A line element as claimed in claim 1, wherein the at least one hoop layer comprises reinforcing elements made of composite material.

9. A line element as claimed in claim 1, wherein the receptacles comprise a portion having a substantially truncated cone shape.

10. A line element as claimed in claim 1, wherein the at least one hoop layer comprises reinforcing elements made of fibres coated with a polymer matrix.

11. A riser section comprising a main tube element and at least one auxiliary line element arranged substantially parallel to the main tube element, wherein the auxiliary line element is a line element as claimed in claim 1.

12. A method for upgrading a riser comprising at least two riser sections, each riser section comprising a main tube element and at least one auxiliary line element arranged substantially parallel to the main tube element, wherein at least the following steps are carried out for at least one riser section:
a) dismounting the at least one auxiliary line element,
b) fastening a receptacle to each end of a tubular steel core,
c) covering the tubular core with at least one hoop layer,
d) positioning with respect to the main tube element the hooped tubular core provided with the receptacles substantially parallel to the main tube element in place of the dismounted auxiliary line element, and
e) fastening a male end fitting and a female end fitting in the receptacles, the male and female end fittings being made of high-strength steel, the receptacles being made of steel having an elastic limit lower than an elastic limit of the male and female end fittings.

13. A method as claimed in claim 12, wherein the male and female end fittings are fastened to the receptacles by screwing, hoop winding or gluing.

14. A method as claimed in claim 12, wherein at least one receptacle is partly covered with the at least one hoop layer.

15. A method as claimed in claim 12, wherein the tubular core is made from the dismounted auxiliary line element.

16. A method as claimed in claim 12, wherein the at least one hoop layer is covered with a protective layer.

17. A method as claimed in claim 12, wherein the method comprises an initial step of disassembling at least one equipment of the riser selected from a float, a clamp or a guide plate.

18. A method as claimed in claim 12, wherein the method comprises a final step of assembling at least one equipment of the riser section selected from a float, a clamp or a guide plate.

19. A method as claimed in claim 12, wherein the tubular core is positioned by flanges provided on the main tube element.

20. A method as claimed in claim 12, wherein the elastic limit of the steel of the receptacles is similar to that of the steel of the tubular core.

* * * * *